United States Patent
Amatangelo (12)

(10) Patent No.: US 6,223,922 B1
(45) Date of Patent: May 1, 2001

(54) STACKABLE, COLLAPSIBLE AND RETURNABLE CONTAINER WITH LOCKING STRUCTURE

(76) Inventor: David A. Amatangelo, 3911 Ridgewood Dr., Erie, PA (US) 16506

( * ) Notice: Subject to any disclaimer, the term of this patent is extended or adjusted under 35 U.S.C. 154(b) by 0 days.

(21) Appl. No.: 09/276,195

(22) Filed: Mar. 25, 1999

Related U.S. Application Data

(60) Provisional application No. 60/079,607, filed on Mar. 27, 1998.

(51) Int. Cl.[7] .................................................. B65D 6/16
(52) U.S. Cl. ................................ 220/6; 206/512; 220/7; 220/4.28
(58) Field of Search ...................... 229/198, 198.1, 229/198.3, 189, 918, 191; 220/6, 7, 4.33, 4.28, 4.29, 4.26, 4.27, 682; 206/512

(56) References Cited

U.S. PATENT DOCUMENTS

| | | | |
|---|---|---|---|
| 964,396 | * 7/1910 | Colle et al. ..................... | 229/198.1 |
| 1,014,297 | * 1/1912 | Gores ............................. | 229/198.1 |
| 1,162,798 | * 12/1915 | Morton ........................... | 229/198.1 |
| 1,501,896 | * 7/1924 | Bal ................................. | 229/198.1 |
| 2,200,320 | * 5/1940 | Zalkind .......................... | 229/198 |
| 2,364,765 | * 12/1944 | Zalkind .......................... | 229/198.1 |
| 3,111,254 | 11/1963 | Thyen . | |
| 3,675,808 | * 7/1972 | Brink ............................. | 220/7 |
| 3,853,239 | 12/1974 | Meller et al. . | |
| 3,866,782 | 2/1975 | Westfall . | |
| 3,904,066 | * 9/1975 | Wilson ........................... | 206/512 |
| 3,937,390 | 2/1976 | Winkler . | |
| 4,274,541 | 6/1981 | Festag et al. . | |
| 4,354,600 | 10/1982 | Treiber . | |
| 4,435,028 | 3/1984 | Rivkin . | |
| 4,441,639 | 4/1984 | Craw et al. . | |
| 4,489,815 | 12/1984 | Martinez et al. . | |
| 4,603,791 | 8/1986 | Spierer et al. . | |
| 4,948,039 | 8/1990 | Amatangelo . | |
| 4,998,637 | 3/1991 | Marovskis . | |
| 5,123,533 | * 6/1992 | Uitz ............................... | 206/386 |
| 5,341,950 | 8/1994 | Sinz . | |
| 5,431,336 | * 7/1995 | Clee .............................. | 229/199 |
| 5,450,962 | * 9/1995 | Uitz ............................... | 206/511 |
| 5,501,354 | * 3/1996 | Stromberg ...................... | 220/7 |
| 5,520,477 | * 5/1996 | Fink ............................... | 403/397 |
| 5,540,536 | 7/1996 | Hoedl . | |
| 5,558,241 | * 9/1996 | Huffstutler, Jr. et al. ...... | 220/1.5 |
| 5,664,678 | 9/1997 | Budowski et al. . | |
| 5,720,410 | 2/1998 | Umiker . | |
| 5,725,119 | 3/1998 | Bradford et al. . | |

FOREIGN PATENT DOCUMENTS

4109151 * 9/1992 (DE) .................................. 220/6

\* cited by examiner

*Primary Examiner*—Allan N. Shoap
*Assistant Examiner*—Joe Merek
(74) *Attorney, Agent, or Firm*—Lovercheck and Lovercheck

(57) ABSTRACT

A returnable reusable container which may be quickly assembled to contain a product and quickly disassembled to a substantially flat condition for storage and return shipping when empty. The container has a rigid member extending around its upper perimeter to prevent twisting of the container. This member has locking means to hold the container in an assembled position, and which unlock to allow the disassembly of the container. The locking means when engaged restrains relative movement at the corners in all directions except the direction required to disengage the lock. When the flaps are fixed to the sides of the container, relative movement at the corners is restrained in all directions.

17 Claims, 6 Drawing Sheets

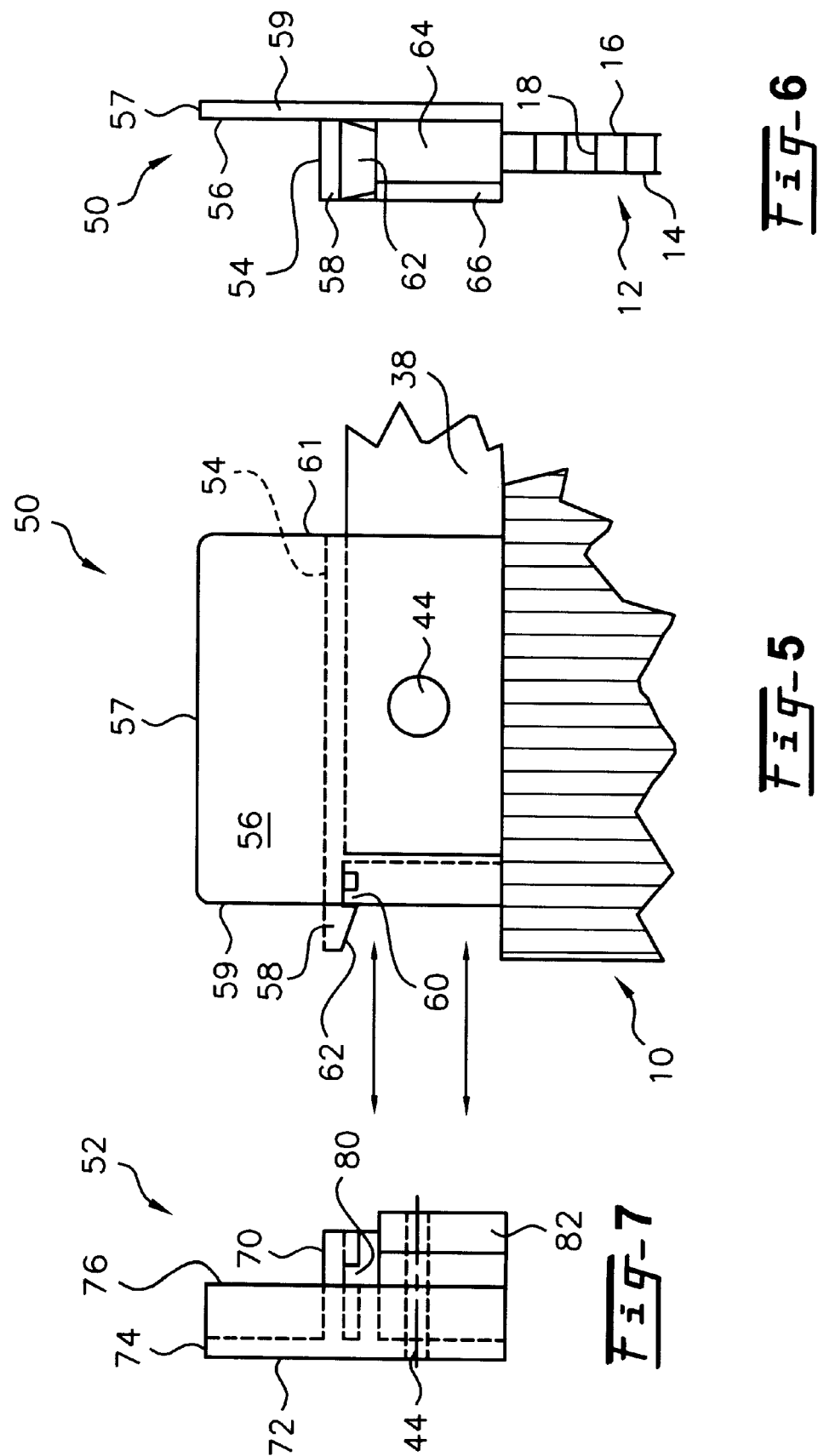

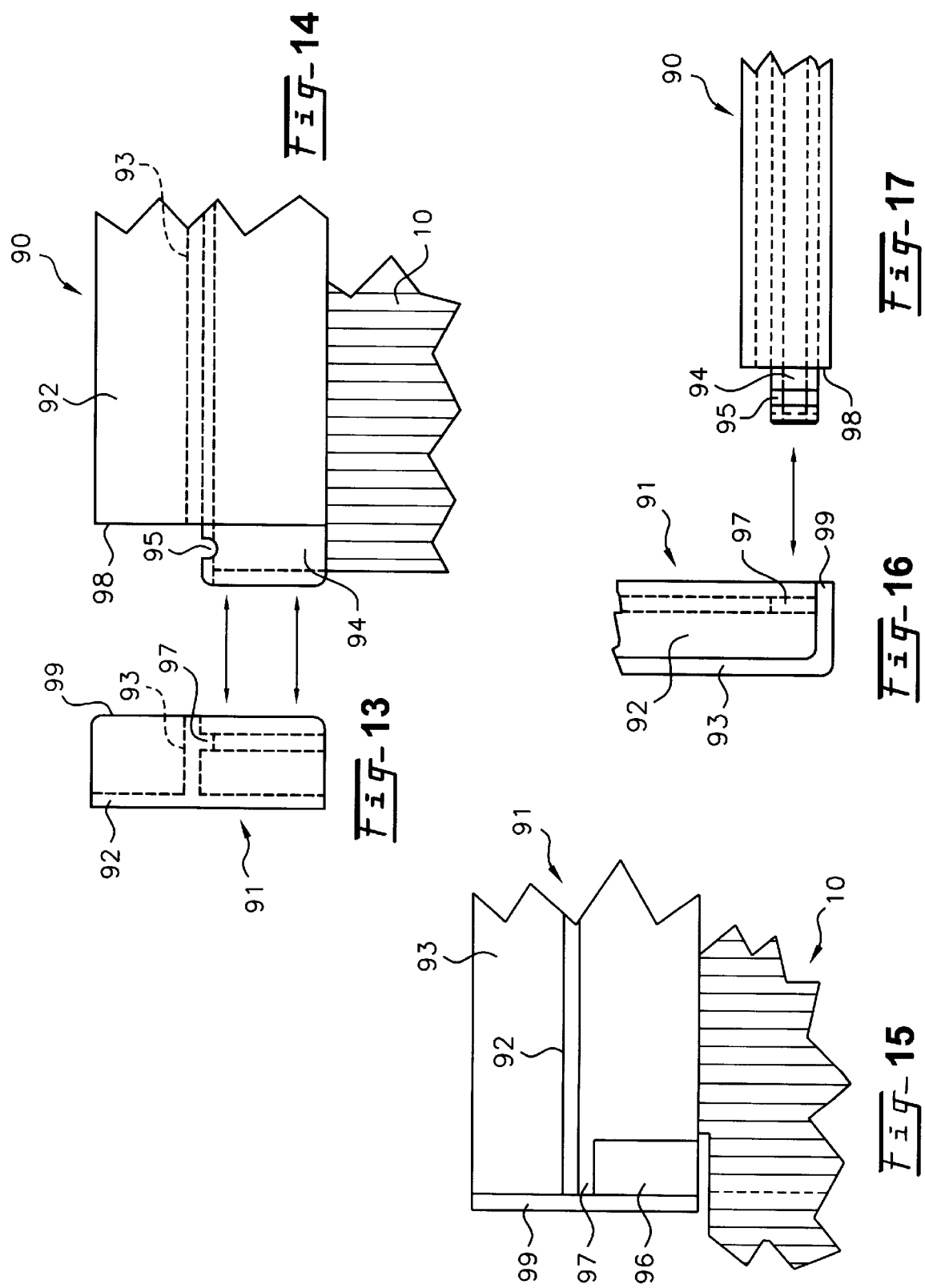

STACKABLE, COLLAPSIBLE AND RETURNABLE CONTAINER WITH LOCKING STRUCTURE

REFERENCE TO PRIOR APPLICATION

This application claims the benefit of U.S. Provisional Application Ser. No. 60/079,607 filed Mar. 27, 1998.

FIELD OF THE INVENTION

This invention relates generally to stackable and returnable containers that may be used to ship and store products, and more specifically to containers which may be assembled to contain a product for storage or shipping, and may be disassembled to a minimum volume when empty for economy in storage and shipping.

BACKGROUND OF THE INVENTION

Returnable and reusable containers are utilized by manufacturers to ship a variety of different products to end users. The reusable containers are then returned to the manufacturers for use in further shipments. The return and reuse of such containers results in a substantial savings in shipping and packaging costs for the manufacturer because they reduce the quantity of new containers which must be purchased. Returning containers also reduces the effort associated with storing, destroying, or otherwise disposing of the containers, resulting in further cost savings.

While such returnable and reusable containers reduce costs by eliminating the need to constantly purchase new containers there are costs associated with reusables. Their return shipment is costly. The charge rate for return shipment is based upon the volume of the container and upon the number of containers which are returned. There have been prior efforts to reduce the volume of the returnable container to increase cost savings when returning empty reusable containers.

The cost of storing conventional reusable containers also reduces the economic benefits they offer. Again, prior efforts have been made to reduce the volume of the reusable containers so that they require less warehouse or storage space as full containers. Container storage will also necessary until return shipment can be arranged. Similarly, the manufacturer will store containers on site to have them on hand and ready for shipment. Storage space is often limited and it is usually desirable to utilize the space for something other than bulky, empty containers waiting to be shipped or returned. Therefore, the economic benefits of currently available reusable containers is further reduced by the cost both to the end user and manufacturer in storage space requirements.

Some currently available reusable containers have addressed such problems by being collapsible into a smaller size or volume (by as much as 75%) to thereby require less space when returned or stored.

Applicant is aware of the following U.S. Pat. Nos.: 5,725,119; 5,720,410; 5,664,678; 5,540,536; 5,341,950; 4,998,637; 4,948,039; 4,603,791; 4,489,815; 4,441,639; 4,435,028; 4,274,541; 4,354,600; 3,937,390; 3,866,782; 3,853,239; and, 3,111,254, which show the state of the art in returnable containers, but do not anticipate Applicant's container structure.

SUMMARY OF THE INVENTION

Applicant provides a stackable returnable container which disassembles to a substantially flap condition to occupy minimum volume to maximize savings on return shipping costs. The returnable container is very simply assembled by folding the sides and ends to a position generally perpendicular to the bottom of the container. The corners are joined and positioned by attaching means at the upper perimeter of the container at both sides of each corner. When the attaching means are engaged, the flaps are folded at each corner. A hook and loop type fastener which consists of a first fastener strip and a second fastener strip which work together to form a fastener. The first fastener strip and the second fastener strip lock the flaps to the sides of the container. The upper perimeter is stiffened by reinforcing member which is coextensive with each of the sides and each of the ends. When the rails are locked, this upper stiffening member eliminates racking or twisting of the container and enables the container to maintain its shape under loading. The stiffening member has a flap upper surface which will support a container placed thereon. There is also a vertical extending flange spaced about the upper perimeter which will position the containers stacked on top to maintain the stack of containers in alignment.

A two piece locking stacking corner structure having first and second portions each ending in complementary locking structures. The locking stacking corner first and second portions are attached to adjoining sides of a container. A tab on first portion slides into groove of second portion. The tab is locked in place by a rail on second portion. Second portion is locked into first portion by twin raise on second portion extending between complimentary rails on first portion.

The locked rails eliminate racking (twisting) of the box and enables the box to maintain its shape under loading. The outer flap of the box holds the first portion into the second portion.

The locking means when engaged restrains relative movement at the corners in all directions except the direction required to disengage the lock. When the flaps are fixed to the sides of the container, relative movement at the corners is restrained in all directions.

It is an object of the present invention to provide a returnable and reusable container that is provided with rigid stacking corners to limit racking when assembled, each rigid corner separating into two portions when the container is disassembled to allow the container to be reduced to a minimum volume when empty.

Accordingly, it is an object of the present invention to reduce the overall shipping costs normally associated with shipping product.

It is another object to reduce such shipping costs associated with both original shipment and return shipment It is further an object of the present invention to reduce the manufacturer's time and labor costs associated with erecting a container to product the shipped product.

It is an additional object to reduce storage space requirements associated with reusable containers.

It is still another object of the present invention to reduce the time and labor costs collapsing and returning empty containers.

It is further an object of the present invention to provide a returnable and reusable container which adequately contains and protects product shipped therein and will occupy less space during return shipment than during original shipment.

It is a further object of the present invention to provide a returnable and reusable container which disassembles to an essentially flat condition.

It is a further object of the present invention to provide a returnable and reusable container which locks when assembled and is stackable.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

FIG. 5 shows an enlarged side view of a first corner portion showing the attaching structure.

FIG. 6 shows an enlarged end view of a first corner portion.

FIG. 7 is an enlarged side view of the second corner portion showing the attaching structure.

FIG. 13 is a side view of the second embodiment of the invention showing the female rigid stacking and portion showing the attaching structure.

FIG. 14 is a partial side view of the second embodiment of the invention showing the male rigid stacking side portion and showing the attaching structure.

FIG. 15 is a partial end view of the second embodiment of the invention showing the female rigid stacking end portion and showing the attaching structure.

FIG. 16 is a partial top view of the second embodiment of the invention showing the female rigid stacking end portion and showing the attaching structure.

FIG. 17 is a partial top view of the second embodiment of the invention showing the male rigid stacking end portion and showing the attaching structure.

DESCRIPTION OF THE PREFERRED EMBODIMENT(S)

Now with more specific reference to the drawings, returnable container 10 is adapted to be used to carry lading for shipment by trucks or otherwise and to be dismantled and folded flat when empty for economical storage and shipment.

Figure 1:
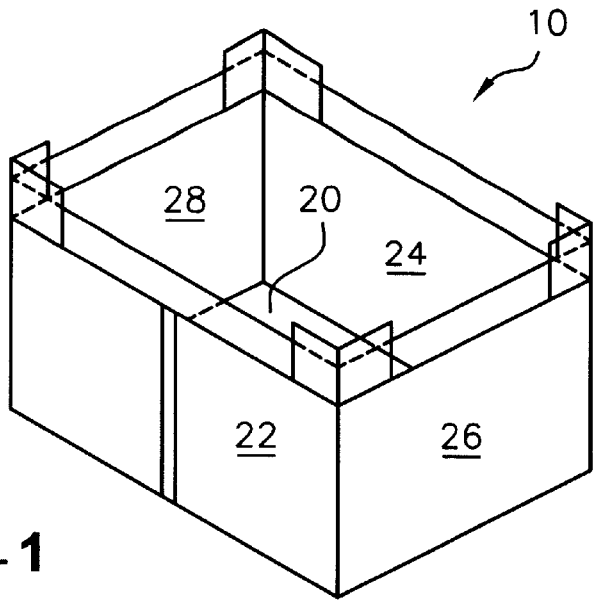
FIG. 1 is a perspective view of an assembled container with the rigid stacking corner portion locked together.
Figure 2:
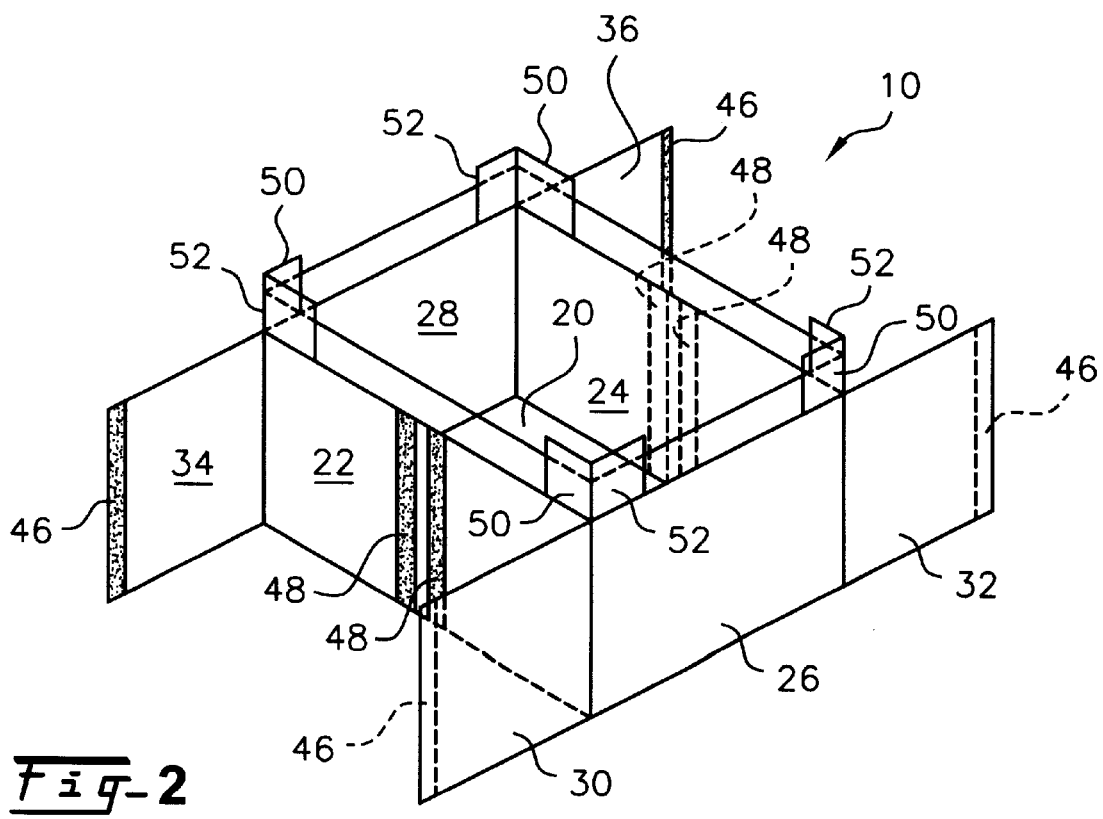
FIG. 2 is a partial perspective view of a partially disassembled container showing the fastener strips released and the locking flaps opened, but the latch members in the corner portions still engaged.
Figure 3:
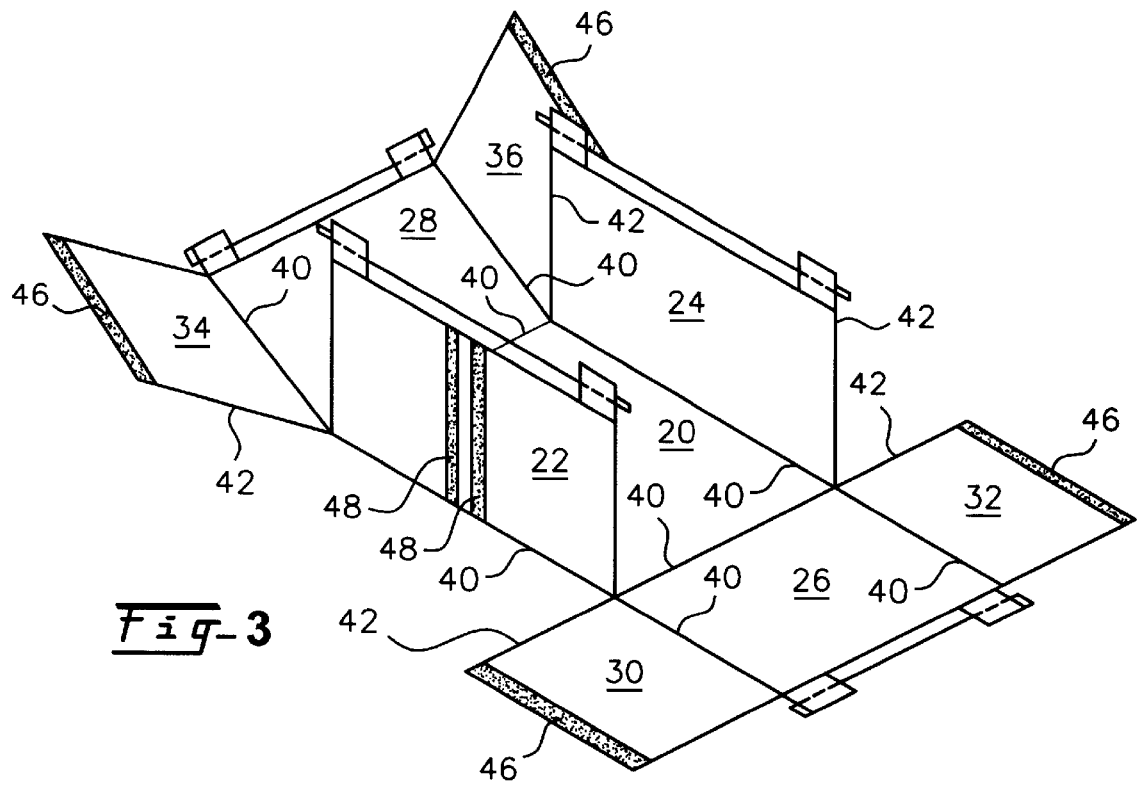
FIG. 3 is a partial perspective view of a partially disassembled container showing the latch members in the rigid stacking corner portions in an unlocked condition.
Figure 4:
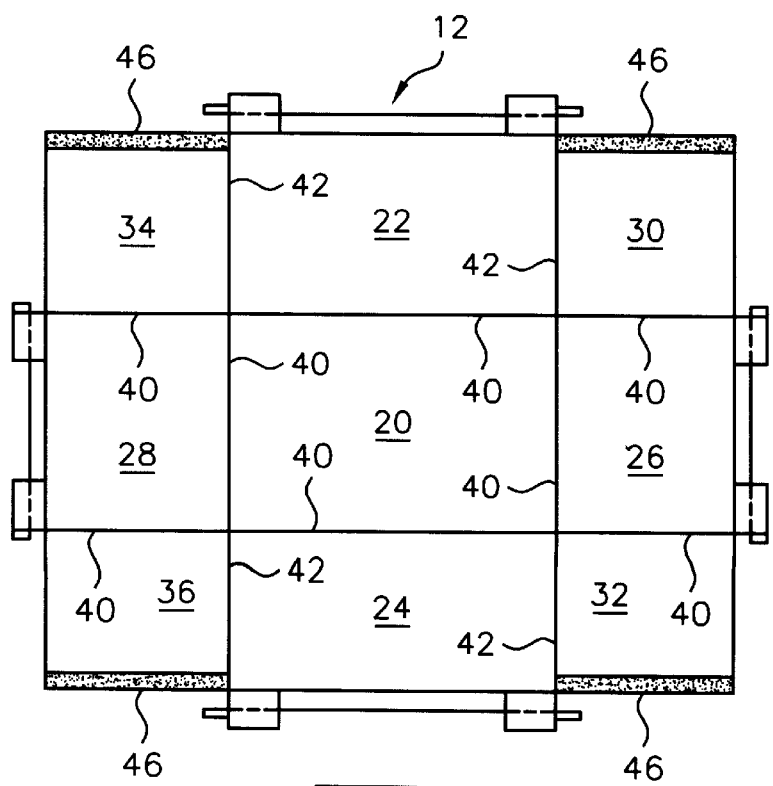
FIG. 4 is a top view of a completely disassembled container in a substantially flat condition ready for return shipment.
Figure 8:
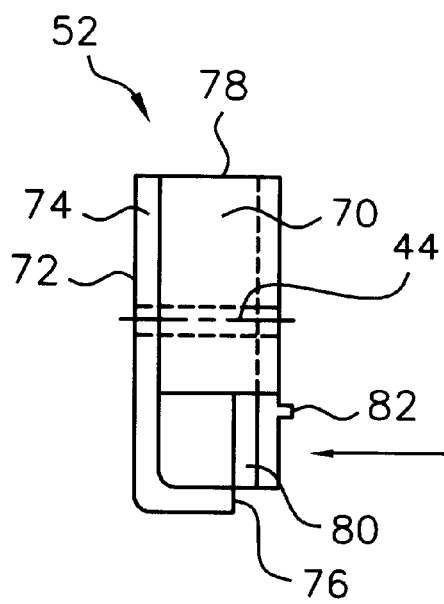
FIG. 8 is a top view of the second rigid stacking corner portion showing the attaching structure.
Figure 9:
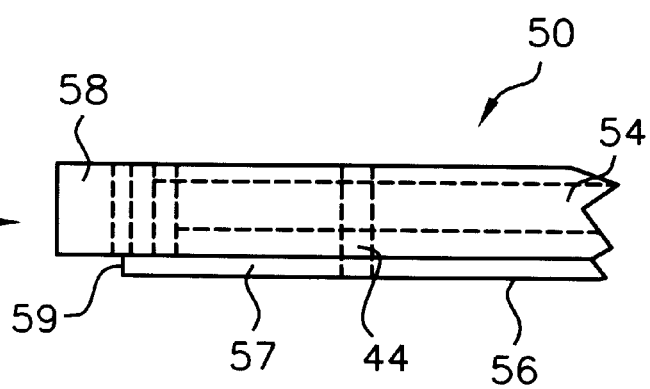
FIG. 9 is a top view of the first rigid stacking corner portion showing the attaching structure.
Figure 10:
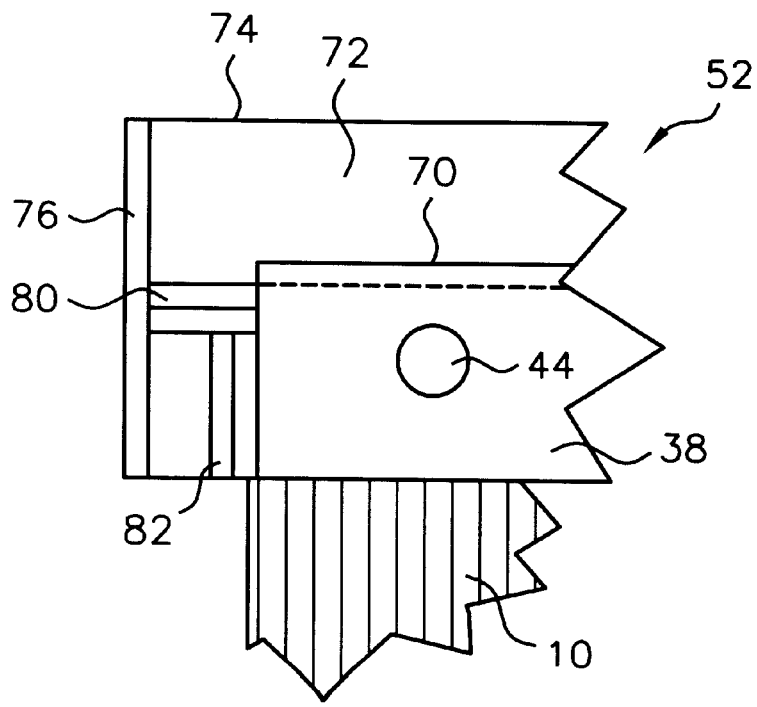
FIG. 10 is a partial side view of a second rigid stacking corner portion showing the attaching structure.
Figure 12:
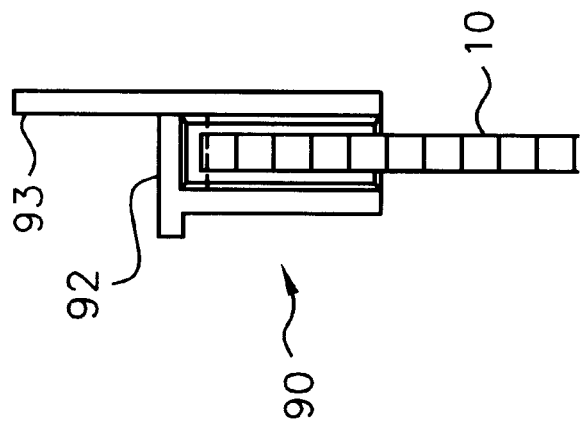
FIG. 12 is an end view of the second embodiment of the invention showing the male rigid stacking side portion showing the attaching structure.
Figure 11:
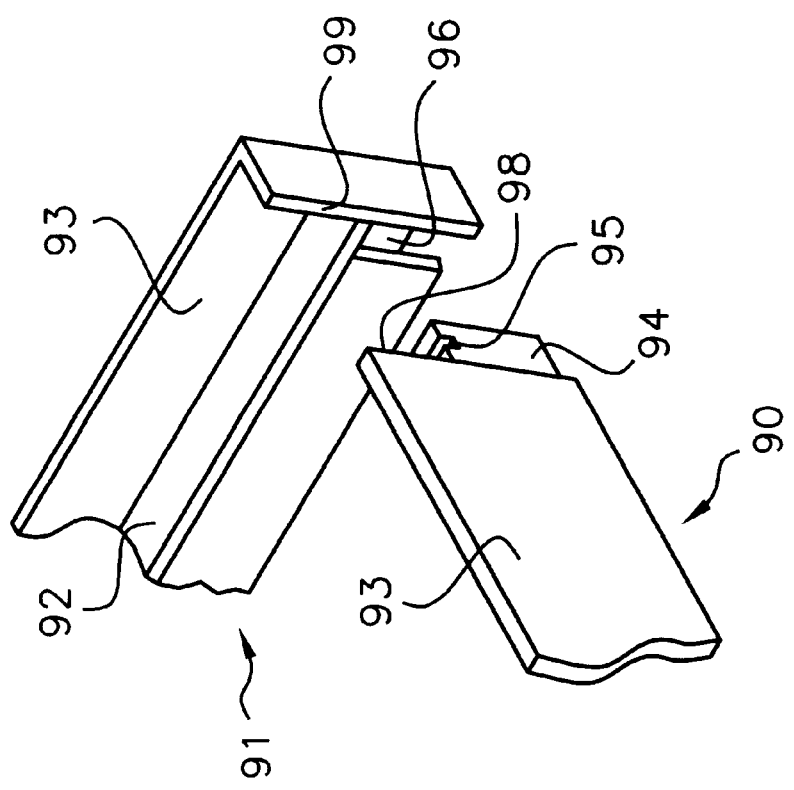
FIG. 11 is a partial perspective view of a second embodiment of the invention showing the rigid stacking side and end portions in an unlocked condition.

Container 10, according to the invention shown in FIGS. 1 through 4, may be made of a flat sheet or panel 12, shown flat in FIG. 4, of a thermoplastic material such as polyethylene, vinyl, polystyrene, polypropylene or like material. As shown in FIG. 6, panel 12 has relatively thin first sheet 14 on one side and relatively thin second sheet 16 on the opposite side. First sheet 14 and second sheet 16 are held in spaced parallel relation to one another by a plurality of relatively closely spaced containing webs 18. Webs 18 may be spaced from one another a distance approximately equal to the distance between first sheet 14 and second sheet 16. Webs 18 may be bent at an intermediate part so that they do not extend directly in a straight line from first sheet 14 to second sheet 16, but may be curved or angular as shown, thereby giving some resiliency between sheets 14 and 16 allowing them to bend when a pressure is expended on the side of the panel and thereby protect the contents.

Container 10 has at least bottom 20, first side 22, second side 24, first end 26, second end 28, first end flap 30, second end flap 32, third end flat 34 and fourth end flat 36. First sheet 14 and second sheet 16, as well as webs 18, may be relatively thin, for example, about 0.0210 inches more or less, depending on the application.

It will be seen that container 10 can easily be assembled by folding first side 22 and second side 24 up, by folding first end flap 30, second end flap 32, third end flap 34 and fourth end flap 36 up then connecting by means of hook and loop fasteners. First fastener strip 46 on each end of end flaps 30, 32, 34, 36 attached to second fastener strip 48 on first side 22 and on second side 24 forming hook and loop fasteners. Container 10 can be easily dismantled into a flat condition, for storage and shipping, by releasing first fastener strips 46 from second fastener strips 48.

In the manufacture of container 10, only first sheet 14 is cut along first lines 40. First sheet 14 and second sheet 16 are both cut along second lines 42.

A U-shaped channel 38 is attached over the upper end of sides 22, 24 and ends 26, 28.

At each corner, first lock member 52 and second lock member 68 are engagingly opposed to each other and are fixed to channel 38 and the distal end of each side and end with barrel screws 44 or other suitable attaching means. First lock member 52 has flat upper surface 54 and upwardly extending flange 56 to support and restrain a container stacked on top of the container. First lock member 52 has outwardly extending latch member 58 with engaging groove 60 in the underside thereof.

Second lock member 58 has flat upper surface 70 and upwardly extending flange 72 to support and restrain a container stacked on top of the container. Second locks member 68 has inwardly extending latch receiving member 74 and web 76 sized to fit in engaging groove 60 in latch member 58.

Container 10 may be constructed by folding first side 22 along first line 40 and second side 24 along first line 40 to positions generally perpendicular to bottom 20. First end 26 and second end 28 are also folded along first lines 40 to positions generally perpendicular to bottom 20. With the ends and sides raised, the corners are formed by engaging notch 60 of latch member 58 of first lock member 50 with raised catch member 80 in second lock member 52. This engagement holds first lock member 50 in relative position to second lock member 52.

Vertical rail block 66 on first lock member 50 engages vertical rail 82 on second lock member holding lock members in relative position to each other. As each of first lock members 50 are attached to second hook members 52, first end flap 30, second end flap 32, third end flap 34 and fourth end flat 36 are folded to sides 22, 24 with first fastener strips 46 engaging second fastener strips 48 securing first and second lock members from relative movement during shipping and storage uses of the container.

Containers may be stacked with the bottom of each successive container being supported on horizontal surfaces 54, 70 of first lock members and second lock members. Containers may be quickly broken down to a substantially flat condition for return shipping by loosening first fastener strips 46 from second fastener strips 48 and moving end flaps 22, 24, 26, 28 outwardly from the sides of the container. First lock member can then be moved upwardly relative to the second lock member to release notch 60 from catch member 80 when each of the lock members are released, sides 22, 24 and ends 26, 28 can be returned to their substantially flat position.

The flat upper surface on second lock member 52 will engage and support successive containers stacked on container. The upwardly extending flange 72 will maintain the containers in a vertical alignment. Vertical upwardly extending flange 42 ends in top 74. Second lock member has first end 76 and second end 78.

In a second embodiment, Applicant has provided a member which ends along the entire distal edge of each of the sides in sides 22, 24 and ends 26, 28 has horizontal disposed surface 92 with the box in the assembled condition extending entirely around the upper perimeter of the container and upwardly extending flange member 93 which extends substantially around the entire top of the container, whereby stacked containers rests on generally horizontal surface 92 and are retained in alignment on the subjacent containers by upwardly extended flanges 93.

First support member 90 mounted on first side 22 and second side 24. First support member 90 has projection 94 a at each of its ends 98. Each projection 94 has notch 95.

Second support member 91 is affixed to distal end of first end 26 and second end 28. Each second support member 91 has recess 96 at each of its ends. Recess 96 has transverse rail 97 which is adapted to engage notch 95 of projection 94 when projection 94 is extended into recess 96 of second support member 91. The sides of recess 96 prevent. sideward relative movement between first support member and second support members. The engagement of notch 95 and rail 97 prevents relative movement of first support member and second support member and by folding first end flap 30, second end flap 32, third end flap 34 and fourth end flap 36 against sides 22, 24, engaging first fastener strips 46 with second fastener strips 48, container 10 is securely assembled. Each end of second support members 91 terminate in end 99.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A returnable container adapted to be assembled to contain a product, the container adapted to be folded substantially flat when empty for economical storage and shipment;
   said container comprising:
   foldably connected panels having at least a bottom, a first side, a second side, a first end, and a second end;
   locking means being provided at each corner to secure said container when assembled;
   said locking means each comprising a first lock member on a side and a second lock member on an end;
   means for releasably securing said first lock member to said second lock member when said container is assembled;
   stiffening means, stacking means and vertical alignment means;
   said stiffening means comprising U-shaped channels fixed to the upper end of each of said first side, said second side, said first end and said second end;
   said stacking means comprising horizontal members extending from each corner along a portion of each side and each end;
   said vertical alignment means comprising vertical members extending upwardly from each said corner along each said portion of each said side and each said end;
   said container further comprising a first flap, a second flap, a third flap and a fourth flap;
   first hook and loop fastener strips on each said flap;
   second hook and loop fastener strips on said first side and said second side whereby said container is formed when the first and second locking means are engaged and said flaps are attached by said hook and loop fasteners.

2. The returnable container recited in claim 1 wherein means for releasably securing said first lock member to said second lock member comprises a latch member extending outwardly from said first lock member with engaging means thereon;
   means for releasably securing said second lock member to said first lock member comprises a latch member receiving area with latch member engaging means therein.

3. The returnable container recited in claim 2 wherein said engaging means on said latch member comprises a notch.

4. The returnable container recited in claim 2 wherein said engaging means in said latch member receiving area comprises a catch member.

5. The returnable container recited in claim 1 further comprising portion alignment means on said first lock member.

6. The returnable container recited in claim 5 wherein the alignment means comprises a rail block on the end of the lock member.

7. The returnable container recited in claim 1 further comprising first and second lock member alignment means on said second lock member.

8. The returnable container recited in claim 7 wherein the alignment means comprises a rail on the end of the second lock member.

9. A returnable and reusable container adapted to be assembled to contain a product, the container adapted to be unassembled to substantially flat condition when empty for economical storage and shipment;
   said container comprising:
   foldably connected panels having at least a bottom, a first side, a second side, a first end, and a second end;
   means for releasably securing said first side and said second side to said first end and said second end thereby forming corners when said container is assembled;

stiffening means, stacking means and vertical alignment means;

said stiffening means comprising U-shaped channels fixed to the upper end of each of said first side, said second side, said first end and said second end;

said stacking means comprising horizontal members extending from each corner along a portion of each side and each end;

said vertical alignment means comprising vertical members extending upwardly from each said corner along each said portion of each said side and each said end;

said container comprising a first flap, a second flap, a third flap and a fourth flap;

first hook and loop fastener strips on each said flap;

second hook and loop fastener strips on said first side and said second side whereby said container is formed when the first and second locking means are engaged and said flaps are attached by said hook and loop fasteners.

10. The returnable container recited in claim 9 further comprising means for stacking and aligning said containers;

said stacking means comprising a horizontal portion and said means for alignment container comprising a vertical portion;

said horizontal portion provides an area to support another container on top of said container;

said vertical portion provides an area to position said other container on top of said container.

11. The returnable container recited in claim 9 wherein means for releasably securing comprises a first locking member and a second locking member;

said first locking member comprises a latch member extending outwardly from said first locking member with engaging means thereon;

means for releasably securing said second locking member to said first locking member comprises a latch member receiving area with latch member engaging means therein.

12. The returnable container recited in claim 10 wherein said engaging means on said latch member comprises a notch.

13. The returnable container recited in claim 10 wherein said engaging means in said latch member receiving area comprises a catch member.

14. The returnable container recited in claim 9 further comprising latch member alignment means on said first latch member.

15. The returnable container recited in claim 14 wherein the alignment means comprises a rail block on the end of the first latch member.

16. The returnable container recited in claim 9 further comprising portion alignment means on said second latch member.

17. The returnable container recited in claim 16 wherein the alignment means comprises a rail on the end of the second latch member.

* * * * *